United States Patent [19]

Regnet et al.

[11] Patent Number: 4,598,436
[45] Date of Patent: Jul. 8, 1986

[54] CLEANING EQUIPMENT FOR THE SEALING SURFACES OF A VESSEL

[75] Inventors: Günther Regnet, Nuremberg; Josef Harrer, Forchheim; Lothar Lüdtke, Erlangen; Robert Weber, Uttenreuth, all of Fed. Rep. of Germany

[73] Assignee: Kraftwerk Union Aktiengesellschaft, Mülheim/Ruhr, Fed. Rep. of Germany

[21] Appl. No.: 623,482

[22] Filed: Jun. 22, 1984

[30] Foreign Application Priority Data

Jun. 22, 1983 [DE] Fed. Rep. of Germany ....... 3322454

[51] Int. Cl.$^4$ ............................................. A46B 13/02
[52] U.S. Cl. ................................................. 15/21 R
[58] Field of Search ................... 15/21 R, 21 E, 49 R, 15/49 C, 49 RB, 50 R, 50 C, 50 A, 98; 114/222; 51/174, 175, 176, 177, 180

[56] References Cited

U.S. PATENT DOCUMENTS

| | | | |
|---|---|---|---|
| 3,216,036 | 11/1965 | Rockwood et al. | 15/98 |
| 3,337,889 | 8/1967 | West | 15/1.7 |
| 3,906,572 | 9/1975 | Winn | 15/1.7 |
| 3,946,692 | 3/1976 | Sierra et al. | 15/1.7 |
| 4,319,434 | 3/1982 | Brejcha | 15/49 R |
| 4,463,469 | 8/1984 | Green | 15/98 |
| 4,485,517 | 12/1984 | Voigt | 15/49 R |

Primary Examiner—Edward L. Roberts
Attorney, Agent, or Firm—Herbert L. Lerner; Laurence A. Greenberg

[57] ABSTRACT

Cleaning equipment for the sealing surfaces of a vessel, includes a remote-controlled carriage for running along a sealing surface, and a cleaning unit carried by the carriage.

16 Claims, 3 Drawing Figures

CLEANING EQUIPMENT FOR THE SEALING SURFACES OF A VESSEL

The invention relates to cleaning equipment for the sealing surfaces of a vessel, which is to be used in maintenance work performed on large vessels.

The sealing surface of vessels, especially reactor pressure vessels and other large vessels used in chemical process technology, carry impurities which are deposited at the edge of the seal in the course of operation. During maintenance of the vessel, when the lid or flange lying on the sealing surfaces is removed, these deposits must be removed so that a tight seating is obtained in the unavoidable case in which the lid or flange is slightly shifted relative to the original seat, when replaced. In the case of vessels for chemical process technology as well as in reactor pressure vessels, it is conventional to manually remove the seal residues and deposits on the sealing surfaces. This is time consuming work in the case of large vessels. In reactor pressure vessels, the high radiation exposure to which the workers are subjected is a further aggravation. As a result, the time during which the person carrying out this maintenance work on the reactor pressure vessel may perform his task is limited, if only for reasons of radiation protection. In addition, the work on the sealing surface of a reactor pressure vessel must be carried out after dressing in full protection suits, which alone represents a considerable accomplishment.

It is accordingly an object of the invention to provide cleaning equipment for the sealing surfaces of a vessel, which overcomes the hereinafore-mentioned disadvantages of the heretofore-known devices of this general type, and which provides a way of reducing the radiation risk for workmen cleaning the sealing surfaces of a reactor pressure vessel. In addition, the cleaning of sealing surfaces of large vessels during maintenance is generally to be accelerated and made less expensive.

With the foregoing and other objects in view there is provided, in accordance with the invention, cleaning equipment for the sealing surfaces of a vessel, comprising a remote-controlled carriage for running along a sealing surface, and a cleaning unit carried by the carriage. This ensures exact guidance of the cleaning unit at a constant distance from the sealing surface, which is an important prerequisite for guiding heavier cleaning units along the sealing surface. In addition, this provides the basis for different embodiments of the cleaning equipment according to the invention.

In accordance with another feature of the invention, there are provided wheels connected to the carriage for moving the carriage on the sealing surface, the wheels having a running radius larger than the radius or curvature of the sealing surface, and two guide posts connected to the carriage for guiding the carriage on an inner wall surface of the vessel. This ensures that the carriage with its wheels runs exactly and reliably on the sealing surface, but outside the sealing area. This is done without falling down laterally inward or outward from the sealing surface and without the need for attaching special guide tracks or strips to the vessel ahead of time.

In accordance with a further feature of the invention, the cleaning unit includes at least one grinding and polishing body, means for driving the body, and means for resiliently pressing the body against the sealing surface. This ensures an elastic grinding-off of impurities without the danger of the cleaning equipment becoming stuck on small irregularities or contaminations.

In accordance with an added feature of the invention, there is provided an electric motor drive connected to the carriage for operating the carriage.

In accordance with an additional feature of the invention, there is provided an electric motor drive connected to the cleaning unit for operating the cleaning unit.

In accordance with again another feature of the invention, there are provided means for preventing the electric motor drive from being activated when the carriage is not moving along the sealing surface.

In accordance with again a further feature of the invention, there are provided wheels connected to the carriage for moving the carriage on the sealing surface, at least one of the wheels being a free-running or non-driven wheel, and a sensor associated with the at least one free-running wheel for controlling the movement or feeding of the carriage.

In accordance with again an added feature of the invention, the driving means rotate the grinding and polishing body about an axis substantially perpendicular to a planar sealing surface.

In accordance with again an additional feature of the invention, the driving means includes at least one disc body eccentrically supporting the grinding and polishing body, the disc body being rotatable about an axis aligned substantially perpendicular to the sealing surface.

In accordance with yet another feature of the invention, the grinding and polishing body is rotatably supported by the disc body.

In accordance with yet a further feature of the invention, the at least one disc body is in the form of a plurality of mutually coupled disc bodies rotatably supported on the carriage, each of the disc bodies carrying a plurality of the at least one grinding and polishing bodies, the grinding and polishing bodies being driven by relative motion between the carriage and the disc bodies, and including an electric motor driving the disc bodies.

In accordance with yet an added feature of the invention, there are provided spraying nozzles disposed on the carriage and aligned toward the sealing surface for flushing water.

In accordance with yet an additional feature of the invention, there is provided a dirt reflector disposed on a forward edge of the carriage, as seen in direction of movement of the carriage.

In accordance with still another feature of the invention, there are provided separate electric motor drives for driving the carriage and the cleaning unit, and encapsulations covering the motor drives for underwater operation.

In accordance with still a further feature of the invention, there is provided a mounting disposed on the carriage for an underwater camera.

In accordance with still an added feature of the invention, there are provided means disposed on the carriage for suspending the carriage from above the sealing surface with a cable to prevent crashing.

In accordance with a concomitant feature of the invention, there is provided a scraper disposed on the dirt reflector for elastically bearing against the cleaning surface.

Other features which are considered as characteristic for the invention are set forth in the appended claims.

Although the invention is illustrated and described herein as embodied in cleaning equipment for the sealing surfaces of a vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
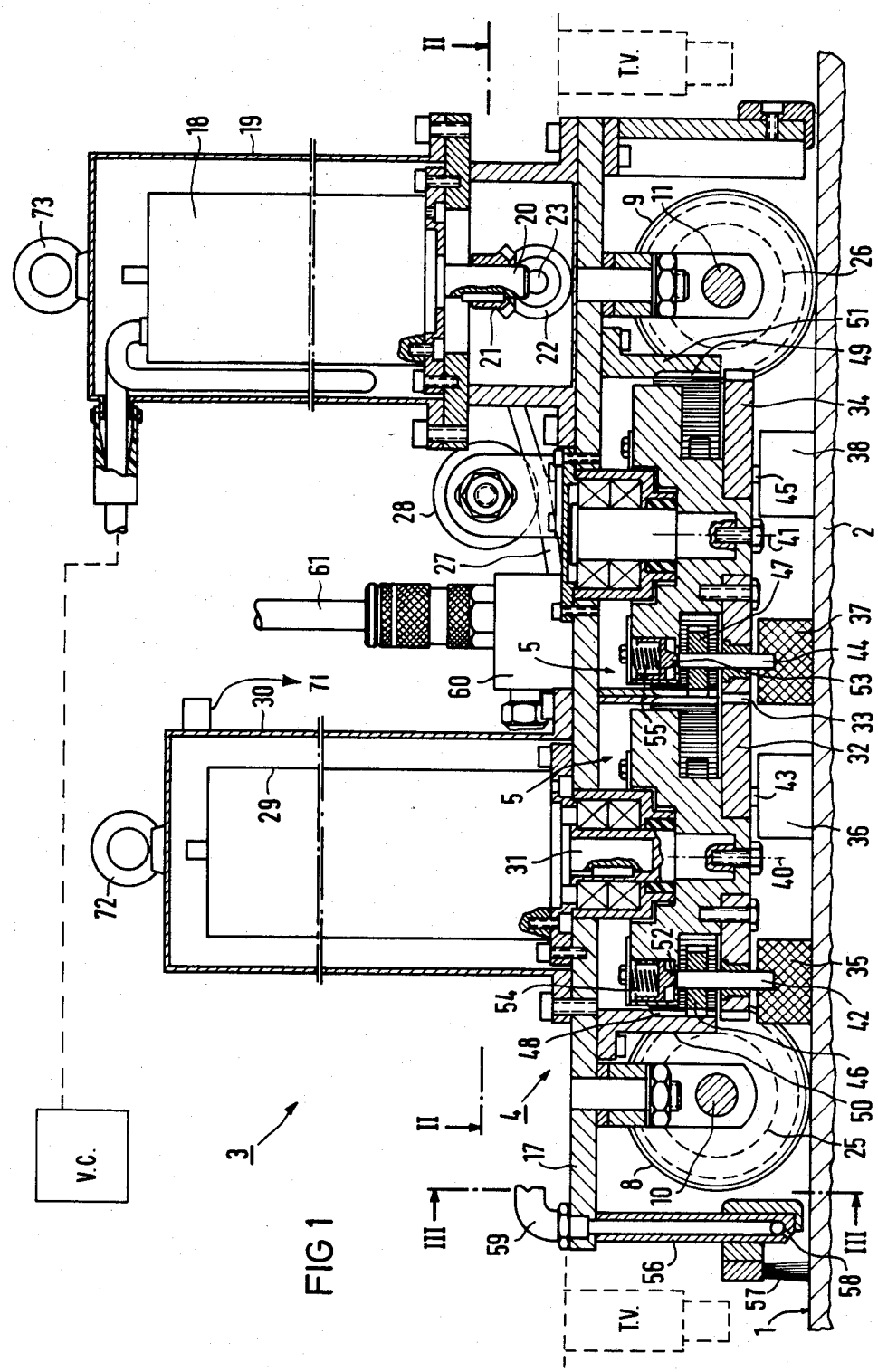
FIG. 1 is a fragmentary, diagrammatic, longitudinal sectional view of cleaning equipment disposed on the sealing surface of a vessel.
Figure 2:
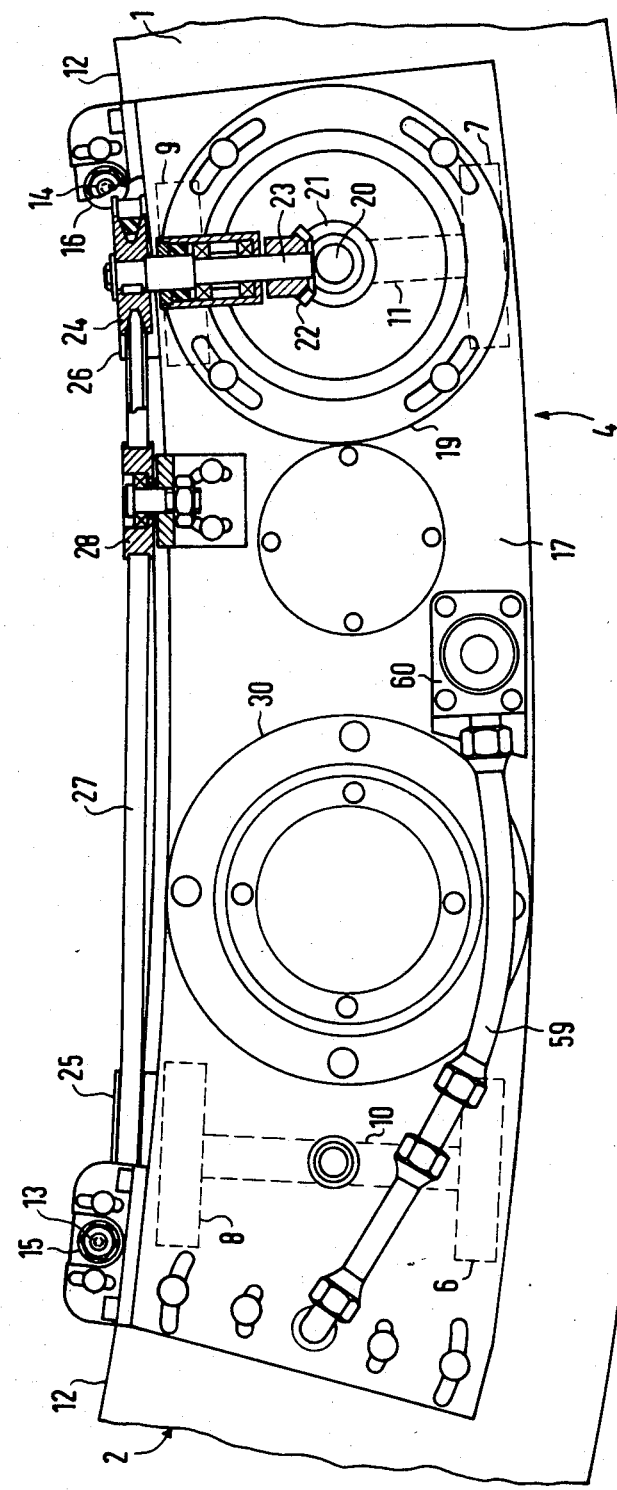
FIG. 2 is a fragmentary, partially cross-sectional view taken along the line II—II of FIG. 1, in the direction of the arrows.

Referring now to the figures of the drawings in detail and first particularly to FIG. 1 thereof, there is seen the internal structure of cleaning equipment 3 standing on the sealing surface 1 of a reactor pressure vessel 2. The cleaning equipment 3 includes essential subassemblies in the form of a carriage 4 which can run on the sealing surface to be cleaned, and a cleaning unit 5 built into the carriage. The carriage 4 can be moved on the sealing surface 1 on both sides of the region in which the cover gasket is disposed, by means of four wheels 6, 7, 8, 9. It can be easily seen in the top view of FIG. 2 that two axles 10, 11 of the carriage 4 are swung slightly toward each other and are aligned almost parallel to the radius of the rim 12 of the sealing surface. A guide post 13, 14 aligned perpendicularly to the sealing surface 1 is fastened to both ends of the carriage 4 on the side of the carriage facing the inside of the reactor pressure vessel 2. Both of the posts protrude several centimeters over the sealing surface 1 into the interior of the reactor pressure vessel 2 and are provided at that location with ball bearings 15, 16 which can be brought into engagement with the inner wall of the reactor pressure vessel. As is shown in FIG. 1, a drive motor 18 for the carriage 4 is connected to a cover plate 17 of the carriage through a flange. The motor 18 is accomodated in a water-tight housing 19. The motor has a shaft 20 which is coupled through two miter gears 21, 22 and a horizontal shaft 23 to a V-belt pulley 24 that is rotatably supported laterally of the carriage by one of the wheels of the carriage. The V-belt pulley is co-planar with two further V-belt pulleys 25, 26, each of which is bolted to the outside of the wheels 8, 9 that face the inside of the reactor pressure vessel 2. An endless V-belt 27 is looped over the three V-belt pulleys 24, 25, 26 and in addition bears against a tightener pulley 28.

Another drive motor 29 for the cleaning unit 5 is also disposed on the upper cover plate 17 of the carriage 4. The motor 29 is likewise accomodated in a watertight housing 30. A vertical drive shaft 31 of the motor 29 is brought through the cover plate 17 of the carriage and supports a first disc body 32 located in a space between the two shafts 10, 11. The disc body 32 is provided at its outer periphery with gearing 33 that meshes with gearing of a second disc body 34. The two disc bodies each carry two grinding and polishing bodies 35, 36, 37, 38, 39 at their outer peripheries, (only five of which are shown) which are shifted or offset relative to each other by 120° and are each rotatably supported about a vertical axis 42, 43, 44, 45 aligned parallel to axes 40, 41 of the disc bodies. The shafts of these grinding and polishing bodies each support a small pinion 46, 47 which meshes with interior gearing 48, 49 of a box 50, 51 that is fastened to the carriage and is aligned concentrically to the respective disc body 32, 34. The ends of each of the shafts 42, 43, 44, 45 of the grinding and polishing bodies 35, 36, 37, 38, 39 facing away from the grinding and polishing bodies, bear against pressure bodies 52, 53. The pressure bodies are pushed against these axes 42, 43, 44, 45 by compression springs 54, 55 held in the disc bodies 32, 34.

A dirt rejection plate 56 which extends to directly over the sealing surface 1, is fastened to the front end of the carriage 4, which is the forward end as seen in the travel direction. The dirt rejection plate carries a scraper 57 which is elastically pushed against the sealing surface, at the end thereof facing the sealing surface. The dirt rejection plate is drilled hollow and carries a spraying nozzle 58 at the edge thereof facing the scraper. The nozzle is fastened through a pipeline 59 to a coupler 60, which in turn is fastened to the cover plate 17 of the carriage 4, for a pressurized-water connection. A pressurized-water hose 61 can be connected to the coupler 60 by a quick-acting closure. Further non-illustrated spraying nozzles are held in alignment underneath the cover plate 17 of the carriage, laterally between the two disc bodies 32, 34 and directly above the sealing surface on the grinding area of the grinding and polishing bodies 35, 36, 37, 38, 39.

Figure 3:
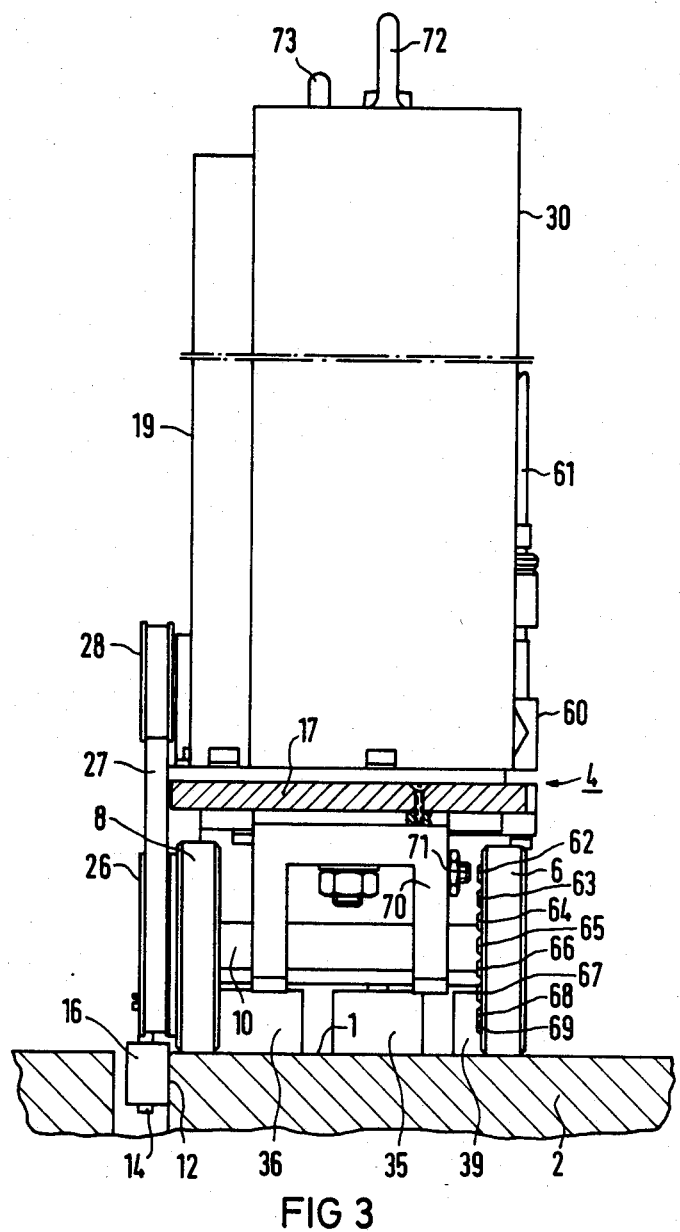
FIG. 3 is a fragmentary, partially cross-sectional view taken along the line III—III of FIG. 1, in the direction of the arrows.

As seen in FIG. 3, one of the free-running or non-driven wheels 6 which does not have a V-belt pulley carries a number of small permanent magnets 62, 63, 64, 65, 66, 67, 68, 69 at equidistant spacings on the inner periphery thereof. A corresponding shaft support 70 carries an inductive transducer 71 directly opposite the permanent magnets. The housings 19, 30 of the two drive motors 18, 29 carry eyes 72, 73 for lifting the cleaning unit. A mount for a television camera together with necessary illumination, which is not shown for the sake of clarity, is disposed at each of the front and back end surfaces of the carriage 4.

If the cover of a reactor pressure vessel 2 has been opened for inspection, the entire cavity located above the reactor pressure vessel must first be flooded in order to reduce the radiation exposure for the maintenance personnel as far as possible. After the maintenance work has been completed, but before the cover is replaced, the old deposit residues of the sealing surface must be removed because otherwise they could cause leaks. For this purpose, the cleaning unit which is suspended by a safety cable from the eyes 72, 73 of the housing 19, 30 of the drive motors 18, 29, can be lowered from a working platform onto the sealing surface of the reactor pressure vessel rim. The space above the reactor pressure vessel can remain flooded.

If the drive motor 18 for the carriage 4 of the cleaning equipment 3 is switched on, it drives the V-belt pulley 24 and the two inner drive wheels 8, 9 of the carriage are driven by the V-belt 27. The carriage therefore starts moving on the sealing surface of the reactor pressure vessel 2. Because the two axles 10, 11 of the carriage 4 are swung from their parallel alignment almost parallel to the radius of the sealing surface 1, the free-running carriage would describe a circular arc which is somewhat larger than the radius of the sealing surface.

As a consequence, the carriage 4 runs outward on the sealing surfaces until the ball bearings 15, 16 of the two vertical guide posts 13, 14 enter into engagement with the inner wall of the vessel. The carriage is then guided by the guide posts along the inner edge of the reactor pressure vessel, and the wheels 6, 7, 8, 9 of the carriage 4 which roll on the sealing surface on both sides of the sealing area proper, push the ball bearings 15, 16 of the guide posts 13, 14 against the inner wall of the vessel. This results in a defined guidance of the carriage on the sealing surface. The wheels roll on both sides of a zone in which the seal or gasket of the cover later comes to rest, without the need for providing separate guide tracks.

While rolling off on the sealing surface 1, the non-driven outer wheels 6, 7 of the carriage are also turned along. The small permanent magnets 63, 64, 65, 66, 67, 68, 69 mounted on one of the outer wheels induce signals in the inductive transducer 71 mounted on the shaft support when this wheel turns. The signals can be received in a non-illustrated monitoring device. These signals are a sure indication that the carriage is running and, for instance, did not become stuck at an obstacle. If the signals fail to arrive, the drive motor 29 for the cleaning unit 5 can be switched off by a logic switching device. This prevents the grinding and polishing bodies 35 to 39 from grinding grooves into the sealing surface, if the carriage 4 is standing still.

The shaft of the drive motor 29 for the cleaning unit 5 directly drives the first disc body 32. The second disc body 34 is taken along through the external gearing thereof. The grinding and polishing bodies supported at the periphery of the two disc bodies are taken along in a circle with their axes 42 to 45. In the process, the pinions 46, 47 which are fastened to the axes of the grinding and polishing bodies roll on the internal gearing 48, 49 of the boxes 50, 51 which are fastened to the cover plate 17 of the carriage 4. As a result, the grinding and polishing bodies are swung around the disc bodies during the rotation of the disc bodies and in the process rotate about their own axes. The grinding and polishing bodies are simultaneously pressed against the foundation, which in the present case is the sealing surface of the reactor vessel. This is caused by the compression springs 54, 55 which are fastened in the disc bodies and are braced against the pressure bodies 52, 53.

The scraper 57 at the forward end surface of the carriage 4 scrapes coarse impurities which are not too strongly attached, off the sealing surface. The water which flows through the spraying nozzles 58 onto the sealing surface flushes away loose dirt particles as well as ground-off impurities. Even if the sealing surface is not flooded, provision is made for sufficient flushing of the region along which the grinding and polishing bodies are guided. A television camera fastened to the two end faces of the carriage 4 by non-illustrated mountings, allows the operating personnel to follow the condition of the sealing surface and the success of the cleaning process, in a radiation-protected control room.

The foregoing is a description corresponding in substance to German application No. P 33 22 454.4, filed June 22, 1983, the International priority of which is being claimed for the instant application, and which is hereby made part of this application. Any material discrepancies between the foregoing specification and the aforementioned corresponding German application are to be resolved in favor of the latter.

We claim:

1. Cleaning equipment for sealing surfaces of a vessel having a curvature with a given radius, comprising a carriage for running along a sealing surface, a cleaning unit carried by said carriage, wheels connected to said carriage for moving said carriage on the sealing surface, said wheels describing a curved path having a running radius larger than the given radius of the sealing surface, and two guide posts connected to said carriage for contacting an inner wall surface of the vessel and guiding said carriage on the inner wall surface of the vessel.

2. Cleaning equipment according to claim 1, wherein said cleaning unit includes at least one grinding and polishing body, means for driving said body, and means for resiliently pressing said body against the sealing surface.

3. Cleaning equipment according to claim 2, wherein said driving means rotate said grinding and polishing body about an axis substantially perpendicular to a planar sealing surface.

4. Cleaning equipment according to claim 3, wherein said driving means includes at least one disc body eccentrically supporting said grinding and polishing body, said disc body being rotatable about an axis aligned substantially perpendicular to the sealing surface.

5. Cleaning equipment according to claim 4, wherein said grinding and polishing body is rotatably supported by said disc body.

6. Cleaning equipment according to claim 4, wherein said at least one disc body is in the form of a plurality of mutually coupled disc bodies rotatably supported on said carriage, each of said disc bodies carrying a plurality of said at least one grinding and polishing bodies, said grinding and polishing bodies being driven by relative motion between said carriage and said disc bodies, and including an electric motor driving said disc bodies.

7. Cleaning equipment according to claim 1, including an electric motor drive connected to said carriage for operating said carriage.

8. Cleaning equipment according to claim 1, including an electric motor drive connected to said cleaning unit for operating said cleaning unit.

9. Cleaning equipment according to claim 8, including means for preventing said electric motor drive from being activated when said carriage is not moving along the sealing surface.

10. Cleaning equipment according to claim 8, wherein, at least one of said wheels is a free-running wheel, and including a sensor associated with said at least one free-running wheel.

11. Cleaning equipment according to claim 1, including spraying nozzles disposed on said carriage and aligned toward the sealing surface for flushing water.

12. Cleaning equipment according to claim 1, including dirt rejection means disposed on a forward edge of said carriage, as seen in direction of movement of said carriage.

13. Cleaning equipment according to claim 12, including a scraper disposed on said dirt rejection means for elastically bearing against the cleaning surface.

14. Cleaning equipment according to claim 1, including separate electric motor drives for driving said carriage and said cleaning unit, and encapsulations covering said motor drives for underwater operation.

15. Cleaning equipment according to claim 1, including a mounting disposed on said carriage for an underwater camera.

16. Cleaning equipment according to claim 1, including means disposed on said carriage for suspending said carriage from above the sealing surface with a cable to prevent crashing.

* * * * *